United States Patent [19]

Domer

[11] Patent Number: 4,984,928
[45] Date of Patent: Jan. 15, 1991

[54] RESILIENT JOINT WITH DIFFERENTIATED RADIAL STIFFNESS

[75] Inventor: Michel Domer, Valdampierre, France

[73] Assignee: Hutchinson, France

[21] Appl. No.: 452,821

[22] Filed: Dec. 21, 1989

[30] Foreign Application Priority Data

Dec. 21, 1988 [FR] France ................................ 88 16917

[51] Int. Cl.$^5$ ............................................. F16B 1/100
[52] U.S. Cl. .................................... 403/228; 403/225; 403/372
[58] Field of Search ............... 403/225, 228, 271, 222, 403/372

[56] References Cited

U.S. PATENT DOCUMENTS 3,337,232 8/1967 Peickii et al. ................. 403/225 X
3,762,747 10/1973 Griffen ................................ 403/225

Primary Examiner—Andrew V. Kundrat
Attorney, Agent, or Firm—Larson and Taylor

[57] ABSTRACT

Resilient joint with differentiated radial rigidity, of the type comprising a resilient material block (3) bonded between two tubular frames (1, 2) which are coaxial at rest, and which may be caused to pivot with respect to each other about their axis, said resilient material block (3) being then subjected to a shearing action under twisting, this block further including, along its periphery, variations of section so as to have unequal rigidity under compression in at least two different radial directions, characterized in that said variations of section are progressive, thus resulting in a thickness of resilient material (3)—measured in directions parallel to said axis—which is progressively variable between ridges (12) and hollows (13), without interruption of continuity.

7 Claims, 1 Drawing Sheet

RESILIENT JOINT WITH DIFFERENTIATED RADIAL STIFFNESS

The present invention relates to a resilient joint of the type comprising a block of resilient material bonded between two tubular frames which are coaxial at rest and may be caused to pivot with respect to each other about their axis, said resilient material block being then subjected to a shearing action under twisting. In some applications, for example in the automobile industry, it is sometimes necessary for the resilient material block to further have unequal stiffnesses under compression in at least two different radial directions, for example in directions which may be both perpendicular to the axis of the frames and perpendicular to each other. For this, the block has variations of section along its periphery. Such variations of section are abrupt since they are produced by cavities spaced apart at the periphery of the block and which may pass therethrough, this block having a constant thickness (measured in the direction of the axis) in the zones separating these cavities. The passage between the normal sections of the block and the reduced sections is therefore as abrupt as may be.

This interruption of continuity results in poor distribution of the shearing forces under twisting in the resilient material block and consequently a reduction of the life of the parts.

One of the aims of the invention is to overcome this drawback of the prior art and, for this, a resilient joint of the type mentioned at the beginning will, in accordance with the present invention, be essentially characterized in that said variations of section are progressive, thus resulting in a thickness of resilient material—measured in directions parallel to said axis—which varies progressively between ridges and hollows, without interruption of continuity.

In some cases, such a joint may thus be characterized by undulating profiles of the developed axis of the resilient material block, these profiles being symmetrical with each other with respect to the median transverse plane of the joint.

The joint may also be characterized by an exact complementarity of the shapes between the relief portions and the hollow portions of resilient material, but that of course is not obligatory. It may in fact be, by way of example, that the angular zones in which the compression strength of the block in a radial direction will have to be great, are larger than the angular zones in which this compression strength will have to be reduced. In such a case, of course, there will be no exact complementarity of the shapes, for the solid portions of the block will have to have a developed length greater than that of the hollow portions.

Another problem raised by such resilient joints resides in the fact that, since they are subjected to corrosion, it is often impossible to remove the bolt which ordinarily passes through the inner frame for fixing the assembly between the flanges of a support fork. It is then advisable to provide protection for the inside of the frame with respect to corrosion other than an electrolytic coating protection, which would be problematic in a long tube of small diameter.

Furthermore, constructors often provide in these flanges holes of a diameter substantially greater than the inner diameter of the inner frame of the joint, so as to facilitate the fitting of the bolt, whence a reduction of the bearing surface of the ends of this inner frame on the flanges of the fork and consequently a risk of these ends being crushed when the bolt is tightened. The bearing surfaces of the ends of the inner frame on the flanges of the fork should then be increased as much as possible. For this, the thickness of this frame should not be increased, so as not to increase its cost price by increasing the weight of material.

According to another arrangement of the invention, these two problems—namely that of corrosion and that of the risk of crushing—are solved because the bore of the inner frame has a coating of anti-corrosion resilient material of sufficient thickness to bring the inner diameter of said frame beyond the diameter of the holes in the supporting fork between the flanges of which the joint is to be fixed, by means of bolt or similar passing through said holes and said inner frame.

Other particular arrangements of the invention have as object to reduce the cost price of such joints.

At the present time, the tubular frames are formed from rolled, welded and redrawn tubes, which is relatively costly.

To obtain lower cost prices, and according to yet another arrangement of the present invention, said tubular frames will be made from rolled metal sheet.

Preferably, the inner frame is closed before moulding of the resilient material block, whereas the outer frame is closed after moulding, at the time of assembly, so as to compensate for moulding shrinkage and even to subject said resilient material block to prestressing.

Before rolling, it will also be advantageous to form in said inner frame holes providing communication, at the time of moulding, between the resilient material of said block and the bore of said inner tubular frame, for forming said coating.

An embodiment of the invention will now be described by way of non limitative example, with reference to the accompanying drawings in which.

In the different figures, the references 1 and 2 designate respectively the outer and inner tubular frames which, as mentioned above, are made from rolled metal sheet.

The resilient material block bonded between these two frames is referenced 3; it may be an elastomer.

Figure 1:
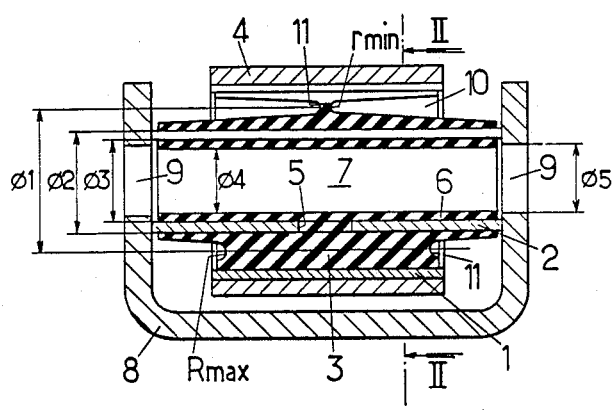
FIG. 1 is a view through the two half axial section planes, perpendicular to each other, I-O and O-I of FIG. 2.
Figure 2:
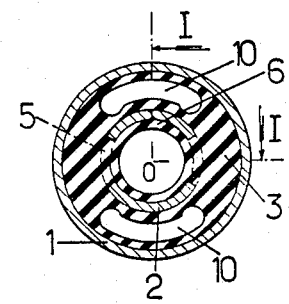
FIG. 2 is a cross-sectional view through line II—II of FIG. 1.
Figure 3:
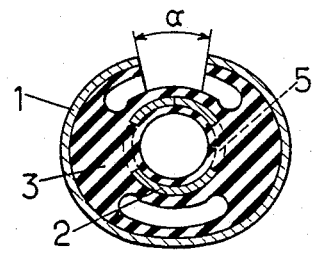
FIG. 3 is a cross-sectional view similar to that of FIG. 2 but before closure of the outer tubular frame and before fitting in the bore of support.

Elastomer 3 is moulded to the configuration of FIG. 3, the inner frame 2 being rolled and closed and the outer frame 1 rolled and still open (the opening angle $\alpha$ has been exaggerated, for better understanding). Thus, during force fitting of the assembly in the bore of the support piece 4 of the outer frame (FIG. 1), this latter is itself closed, until its ends meet, as can be seen in FIG. 2. That further compensates for the shrinkage of the elastomer 3 on moulding and even subjects it to prestressing.

It should be noted that the open part $\alpha$ further provides convenient angular indexation of the joint during fitting, as long as the moulding cores are always positioned in the same way with respect to this open portion. In the case of FIG. 3, for example, it will be known that this portion is in the direction of the lowest radial rigidity under compression. That avoids very simply having to use the usual angular indexation means.

At the time of moulding, and as mentioned above, the elastomer forms the resilient block 3 and at the same time flows through holes 5 in the inner frame 2, so as to form an anti-corrosion coating 6 inside this frame. The inner diameter φ4 of this coating 6 must of course be slightly greater than the diameter of the bolt by which the joint is fixed between the flanges of the support fork 8, these flanges being provided for this purpose with aligned holes 9. Because of the anti-corrosion coating 6, it can be seen that the inner diameter φ3 of the inner frame 2 is slightly greater than the diameter φ5 of the holes 9 of the fork, the diameter φ4 of passage 7 provided for the bolt (not shown) remaining however slightly less than this diameter φ5. Thus, and without increasing the thickness of the inner tube, the whole of the surface of the ends of the inner frame 2 serve for supporting it between the flanges of the fork support 8, which reduces the risk of crushing during tightening of the bolt.

As for the shape of the elastomer block 3, the different figures define it clearly. It can be seen that at each end block 3 has two V grooves 10, which taper towards the bottom. The profiles of these bottoms, referenced 11, have the undulating shape developed or shown in the superimposed plane in FIG. 4. These profiles are as a rule symmetrical with each other with respect to the median transverse plane M of the joint. In the example shown, there is at each end of the elastomer block 3 two diametrically opposite ridges 12 and two diametrically opposite hollows 13, staggered by 90° with respect to the ridges. Thus, elastomer sections S are obtained in the axis of which the radial rigidity under compression may be appreciably higher (about 4 times more) than that in the axis of sections S'.

Figure 4:
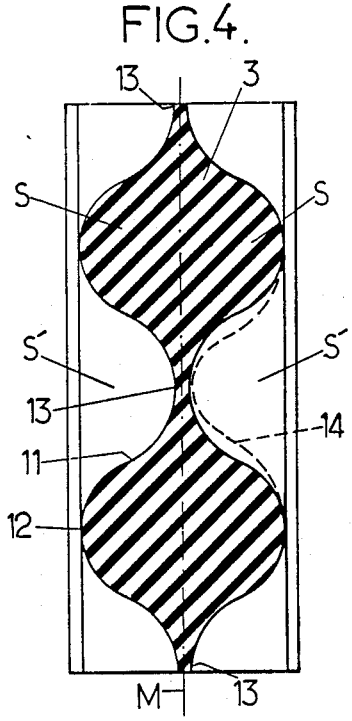
FIG. 4 is a sectional view developed along the circumferential axis of the resilient material block (through $\phi 1$).

In FIG. 4, the sections S and S' are equal and have complementary shapes, but this is obviously not obligatory. Different rigidity ratios could be obtained for example by increasing the solid sections S and decreasing the hollow sections S'. The broken line 14 shows what the profile of the bottom of grooves 10 might be in this case.

Returning to FIG. 1, it can be seen that at the level of ridges 12 the elastomer block 3 is smoothly connected, without interruption of continuity of the section, on one side to the inner frame 2 and on the other side to the outer frame 1 via thinned edges.

This progressive transition is achieved because of the maximum radius of curvature R of the bottom 11 of grooves 10 at this level. This radius of curvature of the bottom of grooves 10 will decrease progressively, as far as the minimum radius r, at the level of the bottom 13 of hollows S'.

I claim:

1. A resilient joint having differentiated radial stiffness comprising:
   an outer tubular frame and an inner tubular frame which are coaxial at rest about an axial axis; and
   a resilient material block bonded between said inner and outer tubular frames whereby when said inner and outer tubular frames are caused to pivot with respect to each other about the axial axis said material block is subjected to a shearing action, said material block including, in a peripheral portion thereof located between said inner and outer tubular frames, variations in axial thickness forming ridges and hollows with the variations being progressive and continuous along the ridges and hollows.

2. A resilient joint as claimed in claim 1 wherein the variations form opposed developed profiles which are symmetrical with each other with respect to a mean transverse plane of said material block.

3. A resilient joint as claimed in claim 1 wherein said material block has respective axial ends attached to said inner and outer tubular frames, each said end including a peripheral groove forming in said material block thinned edges converging to a bottom with said bottom having a radius of curvature in axial cross section which decreases progressively from a maximum at a position adjacent said ridges to a minimum adjacent said hollows.

4. A resilient joint as claimed in claim 1 and further including a support fork having opposed flanges; wherein said inner tubular frame includes a bore coaxial with the axial axis and each said flange includes an aperture coaxial with the axial axis such that a retaining member passing through said holes and said bore mounts said tubular frames and said material block between said flanges, said bore of said inner tubular frame including a coating of anti-corrosion resilient material having a thickness such that an inner diameter of said bore is smaller than an inner diameter of said holes.

5. A resilient joint as claimed in claim 1 wherein said tubular frames are made of a rolled sheet metal.

6. A resilient joint as claimed in claim 5 and further including a tubular support piece in which said outer tubular frame is received by compression of said material block, said inner tubular frame being closed before mounting and said outer tubular frame being open before mounting and closed after mounting.

7. A resilient joint as claimed in claim 4 wherein said inner tubular frame includes apertures therein whereby said material block extends through said apertures and forms said coating of said bore of said inner tubular frame.

* * * * *